Dec. 12, 1972  R. C. BRAUER  3,705,851

WASTE DISPOSAL SYSTEM

Filed Nov. 15, 1971

INVENTOR.
ROBERT C. BRAUER
BY
Andrus, Sceales, Starke & Sawall
Attorneys

United States Patent Office 3,705,851
Patented Dec. 12, 1972

3,705,851
WASTE DISPOSAL SYSTEM
Robert C. Brauer, 2123 N. 89th St.,
Wauwatosa, Wis. 53226
Filed Nov. 15, 1971, Ser. No. 198,549
Int. Cl. C02b 9/00
U.S. Cl. 210—1           12 Claims

ABSTRACT OF THE DISCLOSURE

An above-grade waste disposal system in which refuse us utilized in combination with earth fill to provide an elevated recreational site. The ground area or base is initially graded and sloped, if necessary, toward a low zone and the graded surface is made substantially impervious to the penetration of liquid. Earth fill, preferably obtained by excavating a lake adjacent the low zone of the base, is utilized to construct berms or dikes on the base which define a series of cells. The cells are individually filled with refuse, and earth fill from the excavation of the lake is employed to cover the refuse. As the cells of one tier are progressively filled, additional tiers of cells are formed on the filled cells to ultimately form a hill or small mountain for use as a recreational facility. All leachate from the fill is collected by a drainage system at the low zone of the base for subsequent disposal.

BACKGROUND OF THE INVENTION

The disposal of waste in metropolitan areas is an acute problem. In some cases, incineration units are utilized for the disposal of waste, but incineration units require extremely costly equipment and must incorporate anti-pollution devices to prevent pollution of the atmosphere by the gases of combustion. Because of these factors, waste disposal by incineration is not entirely practical for larger municipalities.

Many larger municipalities utilize sanitary land fill operations. Normally the disposal site is a below grade area, such as an abandoned quarry, gravel pit, or swamp. However, in most localities the volume of refuse overbalances the availability of disposal sites, so that it is often necessary to utilize disposal sites which are located at distant points from the municipality, resulting in substantially increased costs in transporting and handling of the refuse.

In some instances, compaction and baling has been employed to reduce the volume of refuse, and the compacted refuse is then buried by earth fill. However, compaction and baling requires expensive compacting equipment, and as a further disadvantage, the spaces or voids between the bales tend to harbor rodents and provide areas for the accumulation of gases, such as methane.

SUMMARY OF THE INVENTION

The invention relates to an above-grade waste disposal system in which refuse is combined with earth fill to form an elevated recreational facility, such as a ski slope.

In accordance with the invention, the ground area is initially graded and sloped toward a low point or zone. The sloped surface is made impervious to the penetration of liquids, by either compacting the earth surface, if formed of clay or other relatively dense soil materials, or by applying an impervious coating, such as asphalt, plastic, or the like, to the surface.

Earth fill, preferably obtained by excavating a lake adjacent the low point of the base, is utilized to construct berms or dikes on the impervious base and provide a series of generally rectangular open-top cells. The cells are individually filled with refuse, and earth fill obtained from the excavation of the lake is employed to cover the refuse within the cells. As the cells are progressively filled in, additional tiers of cells are formed on the filled in cells to ultimately form a hill or small mountain which can be used as a recreational site.

The invention also includes a provision for collecting any leachate which may drain from the refuse in the cells. A drainage system is located at the low point of the base and any leachate will drain down the base into the drainage system where it can be collected for subsequent disposal.

The system of the invention insures that earth fill is available for use at all times to provide adequate covering protection of the waste or refuse within the cells. The adequacy of the cover material can be enhanced by either increasing the water surface area of the excavation for the lake, or by increasing the depth of the excavation for the lake.

As the waste disposal system of the invention is an above-grade system, the system can be established at any above-grade location within close proximity to a municipality, and this substantially reduces the distance of transport of the refuse and consequently reduces the cost of hauling and handling of the refuse.

The disposal system of the invention will ultimately produce a hill or small mountain of substantial height, up to perhaps hundreds of feet above grade, which can be used in the winter as a recreational ski slope, toboggan slope, etc. By properly developing and landscaping the hill, a valuable improvement to the appearance of the entire area can be achieved.

The waste disposal system also minimizes objections to the unsightliness and nuisance problems of the usual landfill disposal operation. The use of the cells completely shields the refuse from public view, as well as screening the unloading, compacting and other operations carried on by mechanical equipment within the confines of the cells. Furthermore, the use of the cell construction reduces the problems of blowing paper, and also minimizes the danger of fire hazard in that any fire would be confined to the area of that particular cell.

As all the leachate from the fill is collected, any potential ground water contamination is eliminated as opposed to conventional below-grade landfill systems wherein contamination of ground water is a serious problem. The collected leachate can be discharged to a sewer, if a sewage system is available in the area, or can be subjected to treatment and purification at the site and the resulting effluent discharged to the sewer or to a water course.

The system of the invention can also incorporate new developments in waste disposal programs, such as compaction of the waste or shredding followed by recycling to reclaim certain constituents of the waste such as metals, glass, paper, etc. These operations can increase the density of the fill and also reduce problems of blowing paper, insect and vermin habitation, odors, fires, etc.

Other objects and advantages will appear in the course of the following description.

The drawings illustrate the best mode presently contemplated of carrying out the invention.

Figure 1:
FIG. 1 is a perspective view of a hill and lake formed by using the waste disposal method of the invention.
Figure 2:
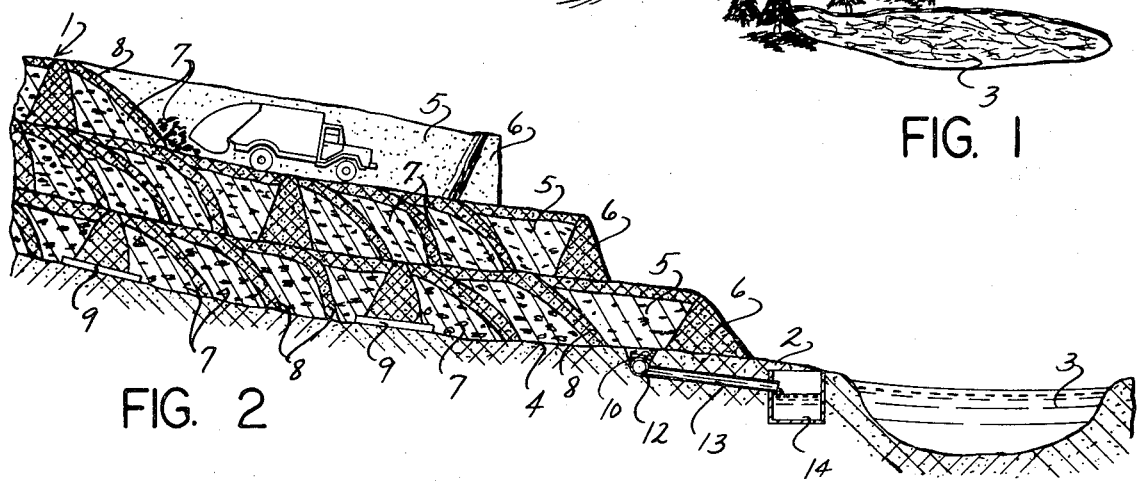
FIG. 2 is a vertical section showing the formation and filling of the cells.
Figure 3:
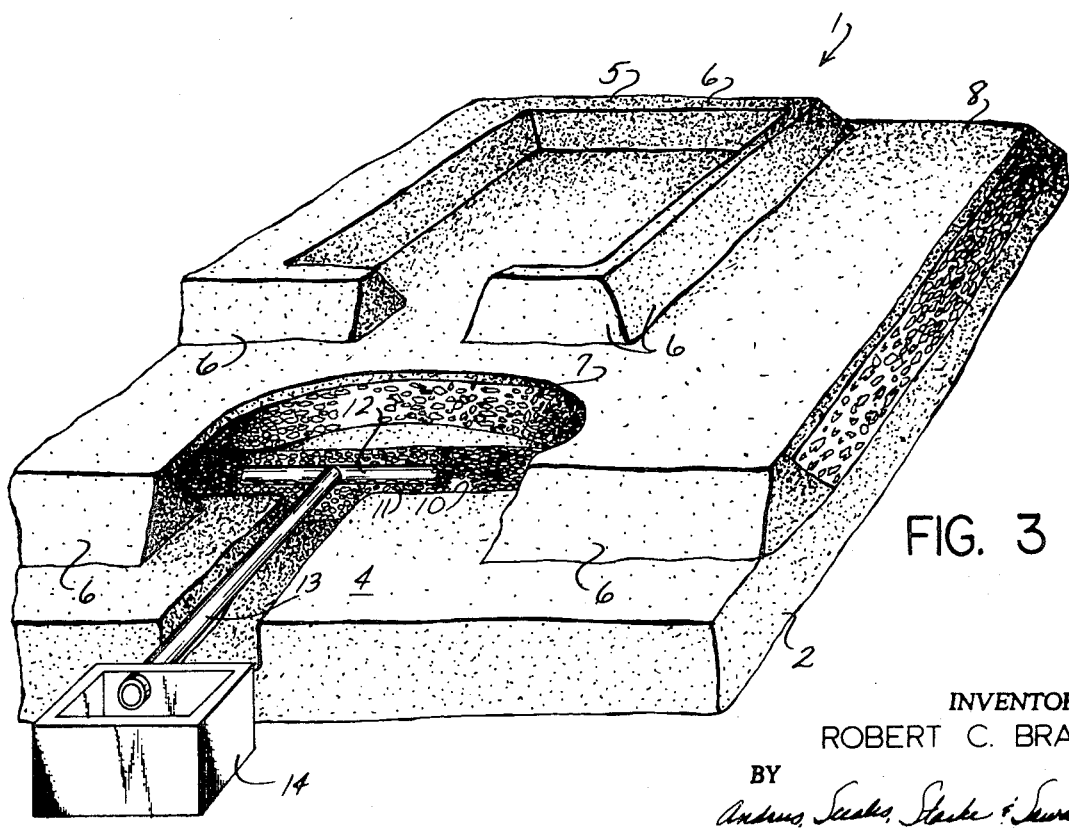
FIG. 3 is a perspective view with parts broken away showing the cell construction and the drainage system for leachate.

The drawings illustrate a small hill 1, or mountain, which is formed on an existing grade or base 2 by utilizing the waste disposal system of the invention. In general, the hill 1 is formed by utilizing the combination of refuse and earh fill excavated from an area which ultimately provides a lake 3.

The base 2 has an impervious upper surface 4 which slopes downwardly toward a low point or zone. The base can be graded, if necessary, to provide the necessary slope, or the natural slope of the terrain can be utilized.

The surface 4 can be rendered substantially impervious to the penetration of liquid materials by a number of methods. If the base 2 is formed primarily of clay, or other relatively dense soil materials, the surface 4 can be rendered impervious by compaction or rolling. The impervious condition can also be achieved by applying binders, asphalt, or other coating materials to the upper surface 4, or by utilizing sheets of thermoplastic material which are anchored to the base. The impervious nature of the surface 4 insures that any leachate liquid which may be generated from the refuse which is subsequently dumped on the base 2 will drain over the surface 4 toward the low end of the surface.

In forming the hill 1 a series of vertically disposed tiers of cells 5 are progressively filled with the combination of refuse and earth fill excavated from the lake 3. More specifically, a lowermost tier of cells 5 is constructed on the base 2 utilizing fill from the excavated lake 3 by forming a series of berms or dikes 6. Each of the berms has a height of about 8 to 12 feet and is substantially wider at the base than at the top. The berms 6 define the generally rectangular cells 5, and one of the berms bordering each cell is provided with an opening through which the refuse trucks and other equipment may enter the cell.

The refuse or waste 7 is dumped by trucks into each individual cell and is normally worked by mechanical equipment toward one of the berms bordering the cell and this tends to compact the refuse. In addition, it is contemplated that waste shredding equipment can be utilized within the cell followed by recycling to reclaim certain materials from the waste, such as glass, metal, and the like. Shredding aids in compaction, thereby reducing problems of blowing paper, odors, fire and insect and vermin habitation. Under normal procedure, each day's deposit of refuse will be covered with approximately six inches of earth fill 8 which is most conveniently obtained from excavating the lake 3. As the cells 5 in the lowermost tier are filled in with the combination of refuse and earth fill, berms 6 are constructed on the filled in cells to provide a second tier of cells which are subsequently filled in with refuse and earth fill in the same manner as described with respect to the lowermost tier of cells. This procedure is repeated with additional tiers of cells being built on the filled in cells until a hill or mountain of substantial height is constructed.

It is preferred to utilize earth fill excavation from the lake 3 to provide the cover for the refuse discharged in the cells, as this fill is convenient to the location of the cells. However, under certain circumstances, such as adverse weather conditions, auxiliary earth fill can be utilized or earth from the berms can be utilized as cover material.

The waste disposal system of the invention also includes a provision for collecting any leachate which may drain from the refuse. To collect the leachate, the berms of the lowermost tier of cells that extend transverse to the slope of the base 2, are provided with a series of drainpipes 9, so that leachate can drain along the sloping surface 4 from cell to cell. In addition, a ditch or collection trench 10 is located along the lower end of the sloping surface 4, and trench 10 contains crushed stone 11 and a perforated drainpipe 12, so that any leachate flowing along the surface 4 will drain into the trench 4 and thus into the pipe 12. Located at the low point of the pipe 12 is a drainpipe 13 which is connected to a reservoir or collection tank 14. The tank 14 can be connected to a sewage system for disposal of the leachate, or if a sewage system is not available, the leachate can be treated and purified at the site and the resulting effluent discharged into the lake 3 or other water course. In some cases a lift station can be utilized to transfer the leachate from the tank 14 to trucks for hauling the leachate to a disposal or treatment site.

By use of the disposal system of the invention, an elevated area of substantial height can be developed which can be utilized as a recreational facility, such as a ski slope, toboggan run, etc. By landscaping the lake 3 and hill 1, the entire area provides a valuable asset to the appearance of the community.

When used as a recreational site such as a ski hill, any possible settling of the refuse that may occur will not restrict the use of the hill.

As the disposal system is an above-ground type, it can be established at any convenient location in close proximity to a metropolitan area. This reduces the distance required for transporting the refuse and eliminates the need for handling or transfer which is frequently necessary when long hauls are employed. As the cost of hauling of the refuse is a substantial factor in the overall cost of the waste disposal system, a considerable reduction in the disposal cost per unit weight of refuse is achieved.

The use of the cell method of construction completely shields the refuse and other operating equipment from public view. Furthermore, the cells minimize the nuisance of blowing paper, confine the dumping to a clearly defined area and confine any fire which might occur to that particular cell so that it cannot spread throughout the entire mass of refuse.

As the system is an above-grade type in which all the leachate water is collected through a drainage system, there is no possible problem of contamination of ground water, as can occur with below-grade disposal systems.

Various modes of carrying out the invention are contemplated as being within the scope of the following claims particularly pointing out and distinctly claiming the subject matter which is regarded as the invention.

I claim:

1. A waste disposal system, comprising a base sloping downwardly toward a low zone and being substantially impervious to the penetration of liquids, a first tier of cells supported on the base and containing a combination of refuse and earth fill, a plurality of vertically superimposed tiers of cells supported on the first tier with each cell of said superimposed tiers containing a combination of refuse and earth fill, each cell being bordered by a substantially continuous berm of earth fill, and drainage means disposed at said low zone for the collection of any liquid leachate drainage through said cells and downwardly along the base.

2. The system of claim 1, wherein said cells are generally rectangular in shape.

3. The system of claim 1, and including an excavated zone adjacent said low zone and depressed beneath the level of said low zone, said earth fill being obtained through excavation of said excavated zone.

4. The system of claim 1, and including conduit means interconnecting the lower portion of adjacent cells in a tier for drainage leachate from cell to cell.

5. The system of claim 1, wherein the berms of each tier are offset from the berms of adjacent superimposed tiers.

6. A method of waste disposal, comprising the steps of developing a sloping base which slopes downwardly toward a low zone, making the upper surface of the base substantially impervious to the penetration of liquids, constructing a first tier of cells from earth fill on the base, each cell being bordered by substantially continuous berms of earth fill, supplying a combination of refuse and earth fill to the interior of each cell to substantially fill each cell, constructing a second tier of cells from earth fill on the filled cells of the first tier with each cell of said second tier being bordered by substantially continuous berms of earth fill, supplying a combination of refuse and earth fill to the interior of each cell of the second tier to substantially fill the same, and draining leachate from said refuse downwardly along the impervious surface of said sloping base to a collection zone.

7. The method of claim 6, wherein said upper surface of the base is made impervious by compacting the earth fill thereon.

8. The method of claim 6, wherein the upper surface of the base is made impervious by applying a binder to said surface.

9. The method of claim 6, in which the cells are filled by periodically introducing a quantity of refuse into each cell and covering said quantity with earth fill and repeating said steps of introducing and covering until the cell is completely filled.

10. The method of claim 6, and including the step of excavating an area of the base adjacent the first tier of cells, and employing the excavated fill from the excavated area for construction of said berms.

11. The method of claim 10, and including the step of forming the excavated area into a lake.

12. The method of claim 11, and including the step of treating the leachate collected at the collection zone to provide a treated effluent, and discharging the treated effluent into said lake.

References Cited

UNITED STATES PATENTS

| | | | |
|---|---|---|---|
| 2,164,536 | 7/1939 | McCarthy | 61—35 |
| 3,586,624 | 6/1971 | Larson | 210—18 |

OTHER REFERENCES

Solid Wastes Promote Cultural Program, Public Works, July 1970, pp. 74–75.

Environmental Wastes Control Digest, Public Works, February 1970, p. 114.

MICHAEL ROGERS, Primary Examiner

U.S. Cl. X.R.

61—11, 35; 210—170